(12) United States Patent
Jang et al.

(10) Patent No.: US 11,496,404 B2
(45) Date of Patent: Nov. 8, 2022

(54) CONGESTION CONTROL FOR LOW LATENCY DATACENTER NETWORKS

(71) Applicant: Google LLC, Mountain View, CA (US)

(72) Inventors: Keon Jang, Mountain View, CA (US); Inho Cho, Gimhae Gyeongsangnam-do (KR); Yi Cui, San Jose, CA (US); Nandita Dukkipati, Menlo Park, CA (US); David Wetherall, Burlingame, CA (US)

(73) Assignee: Google LLC, Mountain View, CA (US)

( * ) Notice: Subject to any disclaimer, the term of this patent is extended or adjusted under 35 U.S.C. 154(b) by 165 days.

(21) Appl. No.: 16/455,115

(22) Filed: Jun. 27, 2019

(65) Prior Publication Data

US 2020/0412657 A1 Dec. 31, 2020

(51) Int. Cl.
*H04L 47/283* (2022.01)
*H04L 43/0864* (2022.01)

(52) U.S. Cl.
CPC ........ *H04L 47/283* (2013.01); *H04L 43/0864* (2013.01)

(58) Field of Classification Search
CPC .................................................. H04L 47/283
See application file for complete search history.

(56) References Cited

U.S. PATENT DOCUMENTS

| | | | | |
|---|---|---|---|---|
| 2004/0049593 | A1* | 3/2004 | Kalyanaraman | .... H04L 12/1886 709/235 |
| 2013/0223254 | A1* | 8/2013 | Oguchi | ................. H04L 47/283 370/252 |
| 2015/0319063 | A1* | 11/2015 | Zourzouvillys | ....... H04L 67/148 370/352 |

OTHER PUBLICATIONS

Jianxin Zhou et al: "Improve TCP performance in Ad hoc network by TCP-RC", Personal, Indoor and Mobile Radio Communications, 2003. PIMRC 2003. 14th IEEE Proceedings on Sep. 7-10, 2003, IEEE, Piscataway, NJ, USA, vol. 1, Sep. 7, 2003 (Sep. 7, 2003), pp. 216-220, XPO10681588, DOI: 10.1109/PIMRC.2003.1264264, ISBN: 978-0-7803-7822-3.
Mohammad Amin Kheirandish Fard et al: "Improve TCP performance over mobile ad hoc network by retransmission timeout adjustment", Communication Software and Networks (ICCSN), 2011 IEEE 3rd International Conference on, IEEE, May 27, 2011 (May 27, 2011), pp. 437-441, Technical Fields XP032050154, DOI: 10.1109/ICCSN.2011.6014086, ISBN: 978-1-61284-485-5.
Minakshee Patil et al: "Enhancing TCP performance in multihop ad hoc networks", 2013 Fourth International Conference on Computing, Communications and Networking Technologies (ICCCNT), IEEE, Jul. 4, 2013 (Jul. 4, 2013), pp. 1-6, XP032560253, DOI: 10.1109/ICCCNT.2013.6726849 [retrieved on Jan. 27, 2014].

(Continued)

*Primary Examiner* — Sulaiman Nooristany
(74) *Attorney, Agent, or Firm* — Lerner, David, Littenberg, Krumholz & Mentlik, LLP

(57) ABSTRACT

Systems and methods for controlling congestion in a data network are provided. A base target round-trip time (RTT) for packets of a network flow including packets transmitted from a source network device to destination network device is obtained. A number of hops packets associated with the network flow traverse between the source network device and the destination network device is determined. A topology scaled target RTT for the network flow is determined based on the base target RTT and the determined number of hops. A congestion window size for the network flow is managed based on the topology scaled target RTT.

16 Claims, 9 Drawing Sheets

(56) References Cited

OTHER PUBLICATIONS

Extended European Search Report for European Patent Application No. 19212316.4 dated Mar. 2, 2020. 12 pages.
Office Action for European Patent Application No. 19212316.4 dated Apr. 11, 2022. 10 pages.

* cited by examiner

CONGESTION CONTROL FOR LOW LATENCY DATACENTER NETWORKS

BACKGROUND

Datacenter networks may include network devices that direct the transmission of data in the form of packets from a source (e.g., a computer, a server, a datacenter, a router, etc.) to a destination (e.g., another computer, another server, another datacenter, another router, etc.). The network devices determine how the data is transmitted from the source to the destination. Typically, the management of packet transmission is carried out on a per flow basis. A network flow refers to a unique stream of data packets that make up a distinct communication stream between two end points. A flow is typically identified by a 5-tuple of information. For example, for TCP flows, the 5-tuple of information for a flow typically includes a source internet protocol (IP) address, source port number, destination IP address, destination port number, and a protocol identifier. For other types of flows, other header data fields can be used to define the 5-tuple. For example, for some protocols, instead of source and destination port numbers, the 5-tuple may include source and destination MAC addresses.

One aspect of packet transmission management common to several network protocols is the setting of a congestion window size. The congestion window size governs how many data packets can be transmitted for a given flow before some of the packets are acknowledged as having been received by the destination network device. Generally, the network devices tend to reduce the size of the congestion windows of flows they are handling as congestion increases, and to increase the size of the congestion windows as congestion decreases. Typical congestion window management techniques, however, fail to adequately distinguish between different sources of congestion, particularly in the context of cloud computing.

SUMMARY

Aspects of the subject technology relate to controlling congestion in a data network. At least one aspect is directed to a method of controlling congestion in a data network. The method includes obtaining a base target round-trip time (RTT) for packets of a network flow including packets transmitted from a source network device to destination network device. The method also includes determining a number of hops packets associated with the network flow traverse between the source network device and the destination network device. The method further includes determining a topology scaled target RTT for the network flow based on the base target RTT and the determined number of hops. The method includes managing a congestion window size for the network flow based on the topology scaled target RTT.

In some implementations, the topology scaled target RTT is determined by adding to the base target RTT a value equal to a per hop time increment multiplied by the determined number of hops.

In some implementations, the congestion window size is managed by transmitting by the source network device a packet associated with the network flow based on a first congestion window size, receiving by the source network device a packet including an acknowledgement message indicating the destination network device received the transmitted packet, determining a RTT for the transmitted packet based on the receipt of the packet including the acknowledgement message, and adjusting the congestion window based on a comparison of the determined RTT for the transmitted packet to the topology scaled target RTT.

In some implementations, the method includes decreasing the congestion window size in response to the determined RTT for the transmitted packet exceeding the topology scaled RTT. In some implementations, the method includes increasing the congestion window size in response to the determined RTT for the transmitted packet not exceeding the topology scaled RTT.

In some implementations, the congestion window is adjusted based on a comparison of the determined RTT for the transmitted packet to the topology scaled target RTT by adjusting the congestion window size only if the determined RTT for the transmitted packet differs from topology scaled target RTT by more than a threshold amount.

In some implementations, the threshold amount is between about 3% and about 10% of the topology scaled target RTT. In some implementations, the number of hops is determined based on evaluation of a TTL field in the packet including the acknowledgement message.

In some implementations, the method includes determining that the number of hops traversed by packets associated with the network flow from the source network device to the destination network device has changed, and in response calculating a second topology scaled target RTT for the network flow. In some implementations, the method also includes determining a second topology scaled target RTT for a second network flow including packets transmitted from the source network device to a second destination network device. The second destination network device is different from the destination network device and the second topology scaled target RTT is different than the topology scaled target RTT.

At least one aspect is directed to a system for controlling congestion in a data network. The system may include one or more processors and a non-transitory computer-readable medium comprising instructions stored therein, which, when processed by the one or more processors, cause the one or more processors to perform operations. The operations include obtaining a base target round-trip time (RTT) for packets of a network flow including packets transmitted from a source network device to destination network device. The operations also include determining a number of hops packets associated with the network flow traverse between the source network device and the destination network device. The operations further include determining a topology scaled target RTT for the network flow based on the base target RTT and the determined number of hops. The operations also include managing a congestion window size for the network flow based on the topology scaled target RTT.

In some implementations, the topology scaled target RTT is determined by adding to the base target RTT a value equal to a per hop time increment multiplied by the determined number of hops.

In some implementations, the congestion window size is managed by transmitting by the source network device a packet associated with the network flow based on a first congestion window size, receiving by the source network device a packet including an acknowledgement message indicating the destination network device received the transmitted packet, determining a RTT for the transmitted packet based on the receipt of the packet including the acknowledgement message, and adjusting the congestion window based on a comparison of the determined RTT for the transmitted packet to the topology scaled target RTT.

In some implementations, the operations include decreasing the congestion window size in response to the determined RTT for the transmitted packet exceeding the topology scaled RTT. In some implementations, the operations include increasing the congestion window size in response to the determined RTT for the transmitted packet not exceeding the topology scaled RTT.

In some implementations, the congestion window is adjusted based on a comparison of the determined RTT for the transmitted packet to the topology scaled target RTT by adjusting the congestion window size only if the determined RTT for the transmitted packet differs from topology scaled target RTT by more than a threshold amount.

In some implementations, the threshold amount is between about 3% and about 10% of the topology scaled target RTT. In some implementations, the number of hops is determined based on evaluation of a TTL field in the packet including the acknowledgement message.

In some implementations, the operations include determining that the number of hops traversed by packets associated with the network follow from the source network device to the destination network device has changed, and in response calculating a second topology scaled target RTT for the network flow. In some implementations, the operations include determining a second topology scaled target RTT for a second network flow including packets transmitted from the source network device to a second destination network device. The second destination network device is different from the destination network device and the second topology scaled target RTT is different than the topology scaled target RTT.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1A:
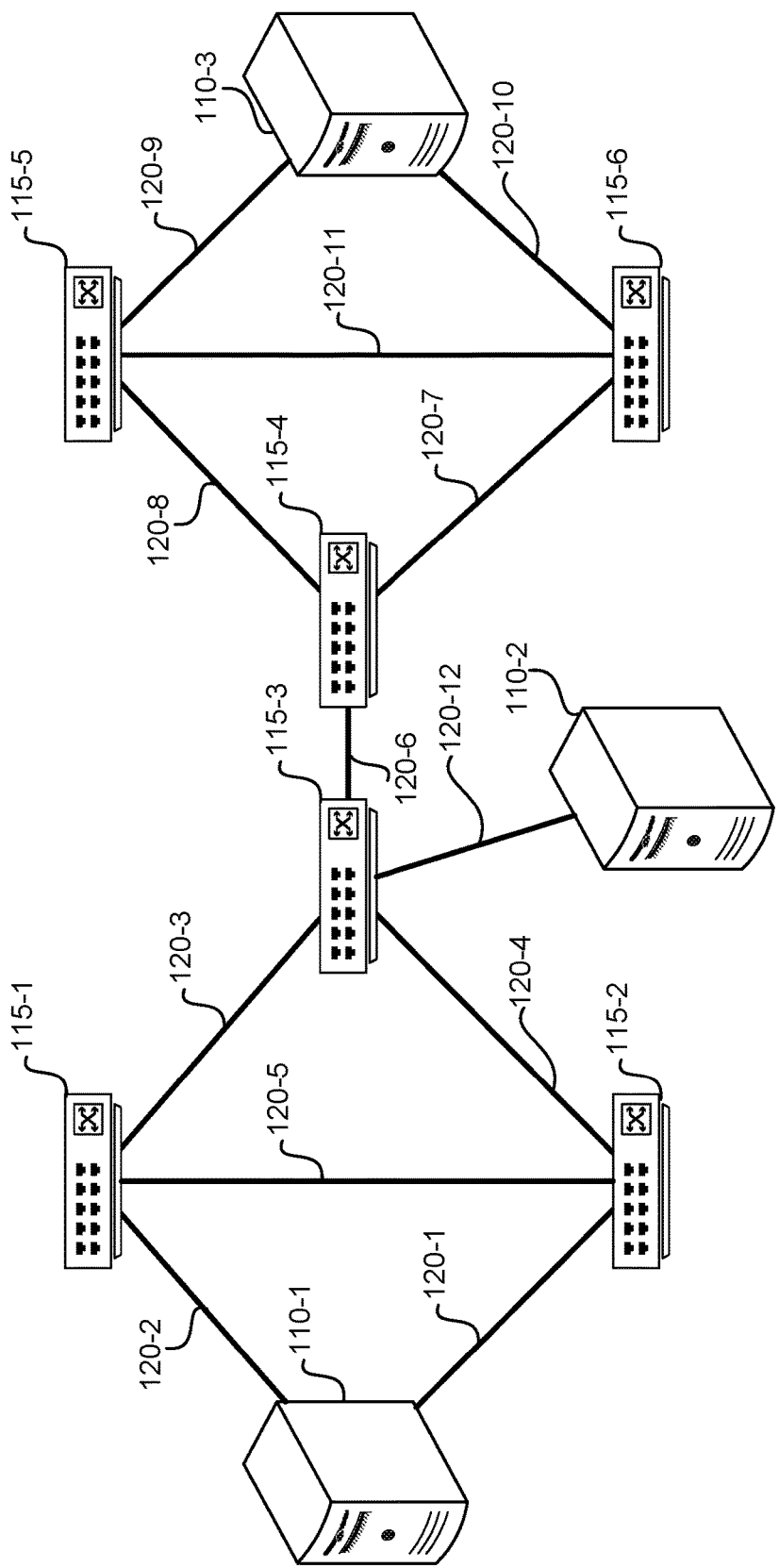
FIG. 1A is block diagram of an example of a data network.

The detailed description set forth below is intended as a description of various configurations of the subject technology and is not intended to represent the only configurations in which the subject technology may be practiced. The appended drawings are incorporated herein and constitute a part of the detailed description. The detailed description may include specific details for the purpose of providing a thorough understanding of the subject technology. However, the subject technology is not limited to the specific details set forth herein and may be practiced without these specific details. In some instances, structures and components are shown in block diagram form in order to avoid obscuring the concepts of the subject technology.

Systems and methods of this disclosure relate generally to transmitting data packets over a data network. In some instances, a data packet is transmitted from a source to a destination in a data network. The transmission of the data packet is managed based on the characteristics of a flow over the data network. The characteristics may include, for example, a target round-trip time (RTT), an actual round trip time, and a congestion window size associated with the flow.

In some implementations, when a data packet takes a longer period of time to be transmitted from a source to a destination, there are multiple factors that may individually or collectively cause the delay in transmission. Congestion, however, can take different forms, particularly in cloud computing contexts in which network devices handle traffic associated with multiple virtualized computing devices, either in the form of virtual machines or containerized environments. Congestion, broadly speaking, can be divided into at least two types of congestion, fabric congestion and engine congestion. Fabric congestion refers to congestion across the network infrastructure between the source and destination of the traffic. Fabric congestion can be caused by limitations on the physical bandwidth of links between nodes in the network and/or between bandwidth limitations of switching and/or routing devices located between the source and destination of the network traffic. Engine congestion, on the other hand, relates to delays introduced by bandwidth constraints within the source and destination network devices, themselves. For example, delays resulting from a packet remaining in a transmission queue at the source node, or from delays an ingress engine at the packet destination being able to process a received packet. Such processing may include guest to physical address translation, decryption, or the execution of other network functions that are carried out on the packet before it is transferred to the actual destination computing environment, e.g., a specific virtual machine or container executing on the destination network device. Particularly in the cloud computing environment, where a given network device may host multiple computing environments, and therefore may receive more network traffic, a great percentage of congestion experienced in data center environments results from engine congestion in comparison to computing environments in which a networking device only hosts a single computing environment.

One metric that can be used to measure congestion in a network is the round trip time (RTT) for a packet to be transmitted to a destination and to have the acknowledgement of the destination having received the packet received by the source network device. In general, for a given flow, if the RTT increases, it is likely due to an increase in congestion in the network. The congestion may result in longer queuing times or potentially a rerouting of the packet through the network over what would otherwise be a sub-optimal path. Similarly, a decrease in RTT for a packet flow suggests a decrease in congestion. Simple RTT metrics, however, cannot indicate the breakdown of the congestion between fabric congestion and engine congestion. Similarly, it cannot by itself distinguish between delays associated with a packet travelling a longer distance versus delays associated with switching delays, queuing delays, and engine delays. As different causes of delays can, and often ought to be managed in different ways, a need exists to better understand sources of congestion in a network and to manage traffic over that network accordingly One method of traffic control that can reduce congestion is management of a congestion window size. As indicated above, the congestion window size is the number of packets associated with a flow that can be transmitted without having one of such packets acknowledged as having been received. For example for with a congestion window of six for a given flow, if the source network device of the has transmitted six packets associated with the flow, it cannot send additional packets associated with the flow until it has received an acknowledgement message from the destination network device that one or more of such packets has been received. For each received packet, the source network device can transmit one additional packet associated with the flow. Decreasing the size of the congestion window for a flow generally decreases the number of packets associated with the packet on the network at a given time, reducing congestion. As congestion decreases, the congestion window size can be increased to allow for greater throughput. If implemented properly, this traffic management technique can be effective for both fabric congestion and for engine congestion. Systems and methods disclosed herein set forth congestion window management techniques that, in some implementations, are effective for distinguishing between and separately managing for both fabric and engine congestion.

FIG. 1A is an example of data network 100 according to one or more embodiments. Data network 100 includes network devices 110-1-110-3 (hereinafter, collectively referred to as "network devices 110") connected by data links 120-1-120-12 (herein after, collectively referred to as "data links 120") and switches 115-1-115-6 (herein after, collectively referred to as "switches 115"). Each of network devices 110 may be one or more electronic devices configured to transmit data within data network 100. For example, each of network devices 110 may represent a server, host computer, or other end node in a computer network.

Data links 120 allow data to be transmitted between network devices 110. Data links 120 may be any type of hardwired and/or wireless data connection. For example, a data link 120 may be a fiber optic link, an electrically conductive link (e.g., copper wire), or wireless link. Data links 120 may be bidirectional or unidirectional.

The transmission of a data packet from a source to a destination in data network 100 may follow any number of different paths. In general, a path may be an ordered set of data links and/or network devices that are connected by data links. For example, data packet may be sent from network device 110-1 (e.g., a source) to network device 110-2 (e.g., a destination) via the data network 100. The data packet may be routed over a number of different paths. For example, the data packet sent by network device 110-1 to network device 110-2 may traverse data links 120-1, 120-4, and 120-12. Alternatively, the data packet may traverse data links 120-2, 120-3, and 120-12. Generally, packets traverse the shortest paths possible between source and destination, though a packet may traverse a longer path if a data link 120 or switch 115 along the shortest path is congested or otherwise impaired in a manner that makes traversing a longer path more efficient. Generally, for transmission protocols in which receipt of packets are acknowledged, such acknowledgement messages usually traverse the same path from the source to the destination, but in the reverse order, so that the acknowledgement message traverses the same data links 120 and same switches 115.

The switches 115 may be switches, hubs, bridges, routers, or other network device that forwards a packet along a path towards its intended destination. Such switches may be packet switches, which read the headers of the packets traversing the switch to identify which of several network interfaces to forward the packet, or a circuit switch (e.g., a crossbar switch or passive optical switch) which passively forwards a packet out an appropriate network interface without evaluating the header of the packet. Such forwarding can be based on the time of receipt of the packet (e.g., for scheduled transmissions) or based on the frequency of an optical carrier wave used to transmit the packet.

Figure 1B:
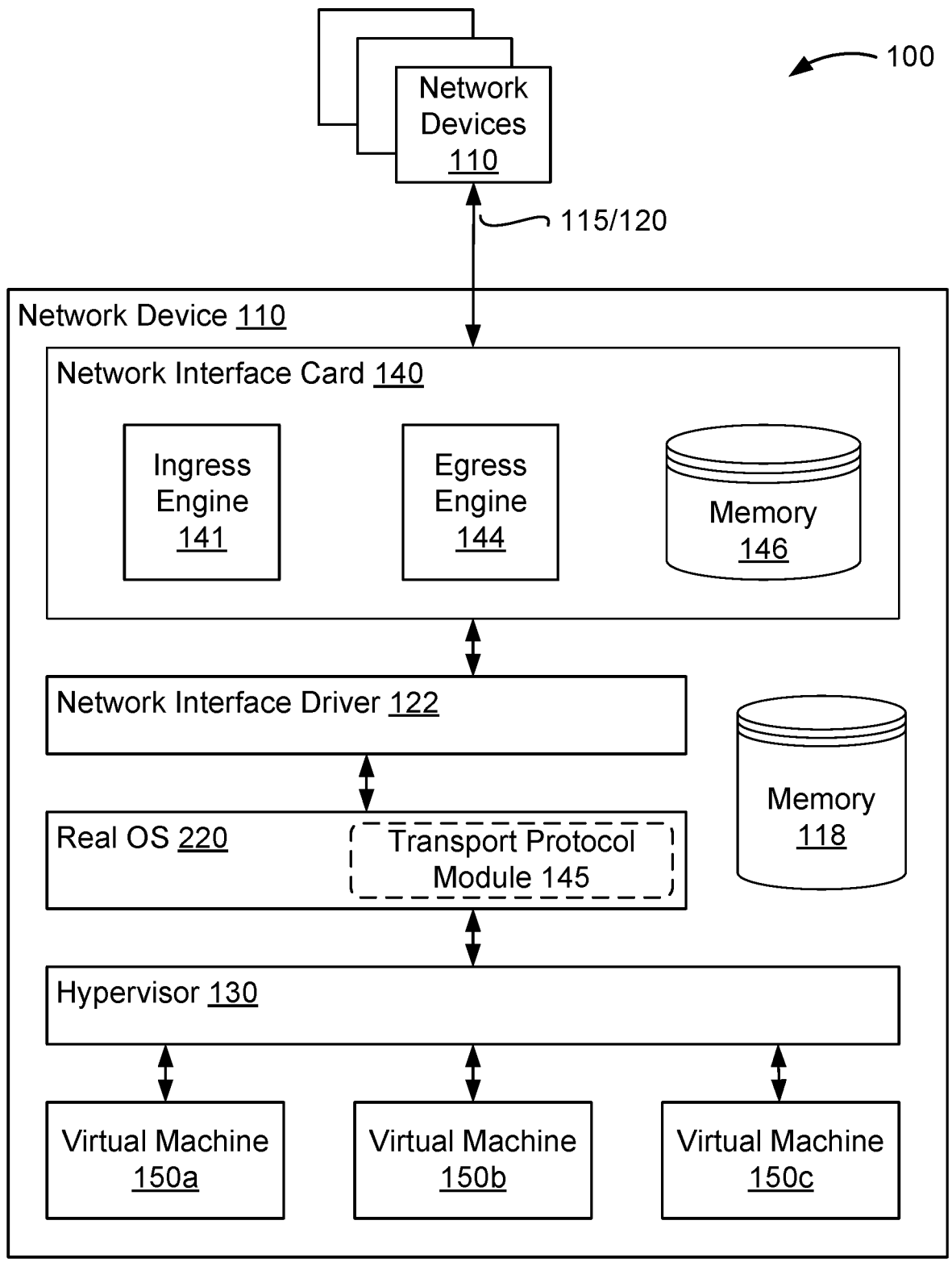
FIG. 1B is a block diagram representing an example network, emphasizing features of an illustrative network device suitable for inclusion in the network.

FIG. 1B is another block diagram representing the network 100, emphasizing features of an illustrative network device 110 suitable for inclusion in the network 100. As shown in FIG. 1B, each network device 110 is communicatively coupled to other network devices 110 via switches 115 and data links 120.

Referring to FIG. 1B in more detail, the network 100 is a network facilitating interactions between participant devices. An illustrative example network 100 is the Internet; however, in other implementations, the network 100 may be another network, such as a local network within a data center, a network fabric, or any other local area or wide area network. The network 100 may be composed of multiple connected sub-networks or autonomous networks. The network 100 can be a local-area network (LAN), such as a company intranet, a metropolitan area network (MAN), a wide area network (WAN), an inter-network such as the Internet, or a peer-to-peer network; for example, an ad hoc Wi-Fi peer-to-peer network. Any type and/or form of data network and/or communication network can be used for the network 100. It can be public, private, or a combination of public and private networks. In general, the network 100 is used to convey information between computing devices; for example, network devices 110.

As shown in FIG. 1B, the network device 110 is a host device or server executing one or more virtual machines 150a-150c (generally virtual machines 150) on one or more CPUs of the network device 110. In some implementations, instead of virtual machines 150, the network device 110 hosts a plurality of containerized computing environments. It would be understood by a person of ordinary skill in the art that discussion herein regarding virtual machine environments can also apply to containerized computing environments.

Figure 7:
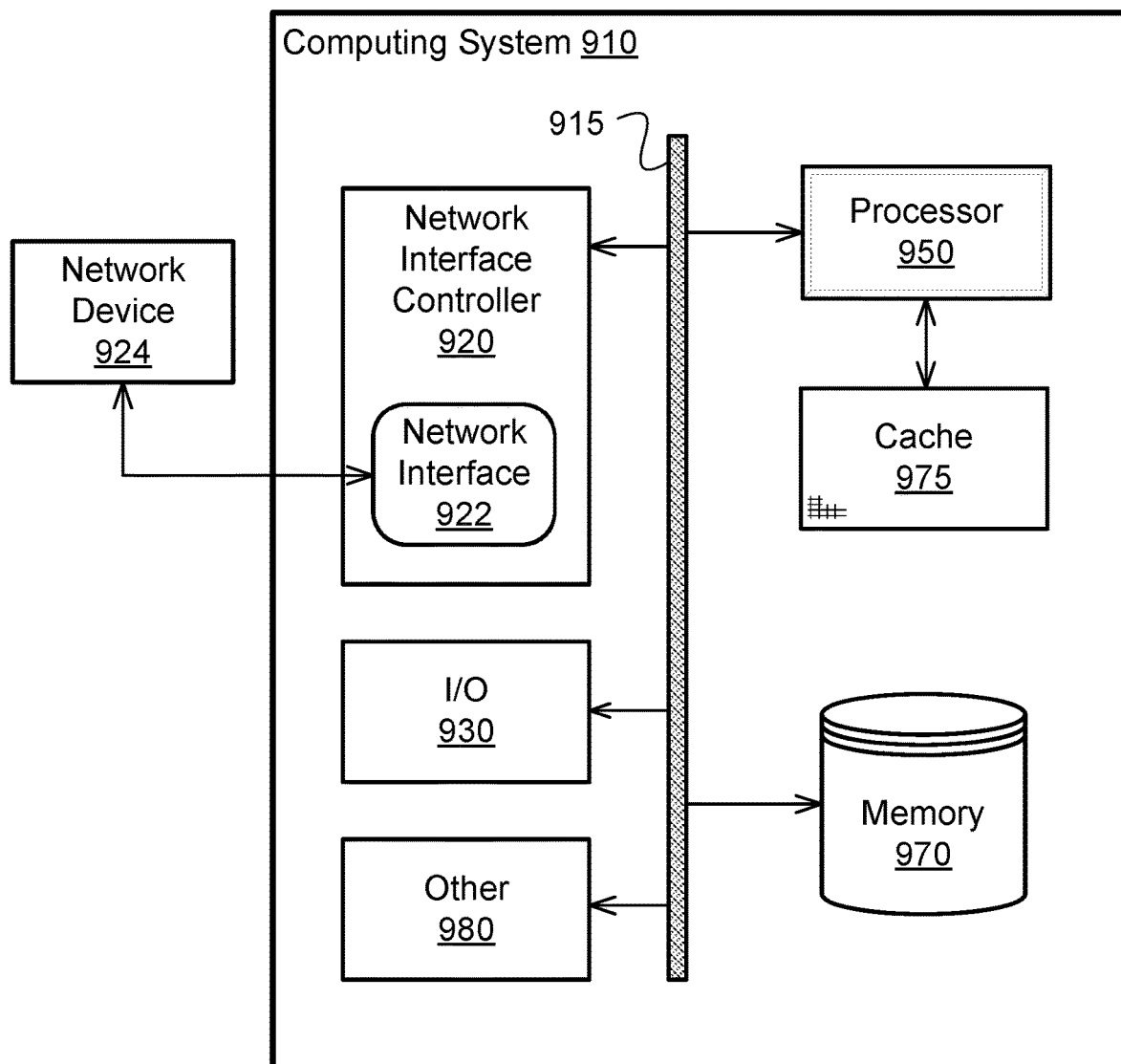
FIG. 7 is a block diagram illustrating a general architecture for a computer system that may be employed to implement elements of the systems and methods described and illustrated herein.

In some implementations, the network device 110 has configuration similar to that of a computing system 910 as shown in FIG. 7. For example, the memory 118 can have a configuration similar to that of a memory 970 as shown in FIG. 7, and the network interface card 140 can have configuration similar to that of a network interface card 922 and/or a network interface controller 920 as shown in FIG. 7. The computing system 910 is described in more detail below, in reference to FIG. 7. The elements shown in the computing system 910 illustrated in FIG. 7 do not all need to be present in some implementations of the network device 110 illustrated in FIG. 1B.

The network device 110 includes a network interface driver 122, a memory 118, a network interface card 140, a real OS 220, a hypervisor 130, and the virtual machines 150. The hypervisor 130 manages operation of the virtual machines 150, including spinning up and terminating the virtual machines 150, managing allocation of memory 118 to the virtual machines 150, and migrating the virtual machines 150 to other network devices.

The network device 110 includes the memory 118. In some implementations, the memory 118 may store computer executable instructions for a real operating system (OS) 220 and a transport protocol module 145 (such as a TCP protocol module or the TCP layer of the network stack) to be executed on a processor of the network device 110. In some implementations, the memory 118 may store computer executable instructions related to the operation and use of a network interface driver 122. In some other implementations, the memory 118 may store computer executable instructions for the hypervisor 130 to be executed on a processor of the network device 110. In some other implementations, the memory 118 may store computer executable instructions for the virtual machines 150 executing on the network device 110. In some other implementations, the memory 118 may store data for forwarding to the virtual machines 150, processing by the virtual machines 150, and/or transmission from the virtual machines 150. The memory 118 may include, for example, a random access memory (RAM), a dynamic random access memory (DRAM), a static random access memory (SRAM), a synchronous dynamic random access memory (SDRAM), a ferroelectric random access memory (FRAM), a read only memory (ROM), a programmable read only memory (PROM), an erasable programmable read only memory (EPROM), an electrically erasable programmable read only memory (EEPROM), and/or a flash memory.

Functionality implemented within the TCP layer of a network device 110 can additionally or alternatively execute in another network protocol module within the transport layer, the network layer or a combined transport/network layer of a network protocol stack. For example, the functionality can be implemented in a user datagram protocol (UDP) module, reliable datagram protocol (RDP) module, reliable user datagram protocol (RUDP) module, or a datagram congestion control protocol (DCCP) module. As used herein, a network layer, a transport layer, or a combined transport/network layer will generally be referred to as a packet layer of the network protocol stack.

The network interface driver 122 can include a network interface driver software module running on a real OS. A network interface driver, such as the network interface driver 122, can be a collection of computer executable instructions stored in the memory 118 that when executed by a processor help facilitate network communications. In some other implementations, the network interface driver 122 may be implemented as logic implemented in a hardware processor or other integrated circuit, or as a combination of hardware and software logic. The network interface driver 122 can communicate with one of the software virtual machines 150 (or applications executing on the virtual machines 150), via a guest OS of a virtual machine (or in some implementations, through a hypervisor and the guest OS if operating in a virtual machine environment). In some implementations, the network interface driver 122 is included within a first layer of a transmission control protocol (TCP) stack of the real OS 220 of the network device 110 and communicates with a software module or application that is included in an upper layer of the TCP stack. In one example, the network interface driver 122 is included within a transport layer of a TCP stack and communicates with a software module or application that is included in an application layer of the TCP stack. In another example, the network interface driver 122 is included within a link layer of a TCP stack and communicates with a TCP/IP module that is included in an internet/transport layer of the TCP stack. In some implementations, the functionality is additionally or alternatively configured to receive packets from another network or transport layer protocol module, such as a user datagram protocol (UDP) module, reliable datagram protocol (RDP) module, reliable user datagram protocol (RUDP) module, or a datagram congestion control protocol (DCCP) module. In some other implementations, the network interface driver 122 can be included as a portion of the network interface card 140.

The network interface card 140 includes an ingress engine 141, an egress engine 144, and a memory 146. The ingress engine 141 and egress engine 144 can be functional blocks of one or more processors of the network interface card 140, such as an application-specific integrated circuit (ASIC) having discrete functional blocks. In some implementations, the ingress engine 141 and egress engine 144 can be functional blocks of software executing on one or more general-purpose processors of the network interface card 140. In some implementations, the functions of the ingress engine 141 and egress engine 144 can be combined or further subdivided into different functional blocks.

The memory 146 can store computer executable instructions for execution by network interface card 140, such as instructions relating to the operation of the ingress engine 141 and the egress engine 144. The memory 146 can provide for caches, buffers, translation tables, and/or time-indexed data structures used by the network interface card 140, virtual machines 150, and/or hypervisor 130 for the transmission and receipt of data packets over the network 100. For example, the memory 146 can store, for each virtual machine 150, one or more receive queues and transmit queues. In another example, the memory 146 can store tables containing translations of virtual memory addresses associated with virtual machines 150 to physical memory addresses of regions of the network device 110 in memory 118 respectively allocated to the virtual machines 150. The memory 146 may include, for example, a random access memory (RAM), a dynamic random access memory (DRAM), a static random access memory (SRAM), a synchronous dynamic random access memory (SDRAM), a ferroelectric random access memory (FRAM), a read only memory (ROM), a programmable read only memory (PROM), an erasable programmable read only memory (EPROM), an electrically erasable programmable read only memory (EEPROM), and/or a flash memory.

The ingress engine 141 of the network interface card 140 is responsible for handling received packets. In some implementations, the ingress engine 141 may manage multiple receipt queues maintained in the memory 146 for storing received packets until such packets are processed by the network interface driver 122 and are passed on to a destination virtual machine 150. In some implementations, the ingress engine 141 maintains a separate queue for each virtual machine 150. In some implementations, the ingress engine 141 maintains separate queues for packets marked with having different quality of service flags. In some implementations, the ingress engine 141 executes a received packet scheduler for controlling the timing of processing of packets in the respective queues by the network interface driver 122. In some implementations, such scheduling functionality is integrated instead into the network interface driver 122.

The egress engine 144 manages the transmission of packets received by the network interface card 140 from the network interface driver 122. Such packets include both traditional data packets transmitted by applications executing the virtual machines 150, as well as control packets, such as acknowledgement packets sent to acknowledge receipt of packets, session initiation packets and session termination packets used to set up and tear down communication sessions between network devices. In some implementations, the egress engine 144 maintains multiple transmit queues within the memory 146. The queues may be associated with individual virtual machines 150 or quality of service identifiers, or shared across multiple virtual machines 150 and/or quality of service indicators. The egress engine 144 may also include a packet builder that takes data to be transmitted by the network interface card 140, breaks the data down into multiple packets, and adds any necessary header information to the packets prior to transmission. In some implementations, such packet building functionality may be implemented by the network interface driver 122 or the functionality may be split between the network interface driver 122 and the network interface card 140.

Figure 1C:
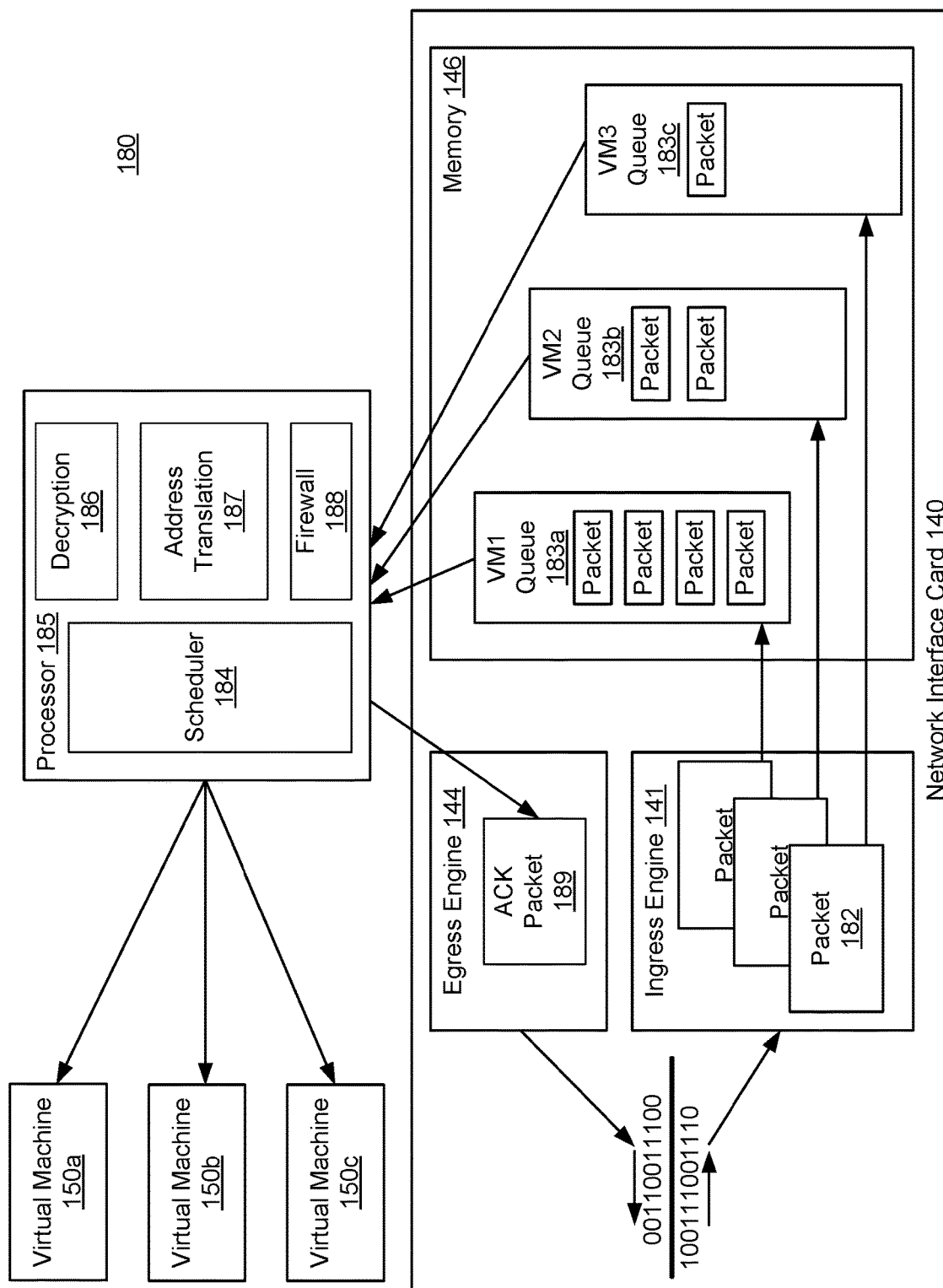
FIG. 1C is an example block diagram depicting example processing steps performed by an example network device with respect to received data packets.

FIG. 1C is an example block diagram 180 depicting example processing steps performed by an example network device 110 with respect to received data packets 182. FIG. 1C depicts certain processing performed directly by a network interface card 140 of a network device 110, as well as processing performed by the processor (and software executing thereon) of the network device 110 itself.

As shown in FIG. 1C, data packets 182 are received as a stream of bits 183 (encoded using an optical or electrical encoding scheme), which are converted into received data packets 182. The data packets are processed by the ingress engine 141 and are stored in various queues 183a-183c (herein after referred to as "queues 183") in the memory 146 of the network interface card 140 associated with each of the virtual machines 150 executing on the network device 110. As shown in FIG. 1C, different virtual machines 150 may receive packets 182 at different rates, and therefore the queues 183 associated with the respective virtual machines 150 may have different numbers of packets stored therein. Similarly, depending on the policies implemented by the network interface driver 122 and/or ingress engine 141, packets may be removed from the respective queues 183 at different rates, which may result in further variation in the number of packets 182 stored in the queues 183. The rate at which packets 182 are processed from the respective queues 183 is controlled by a scheduler 184. The scheduler 184 is shown in FIG. 1C as a functional block (implemented e.g., as part of the network interface driver 122 executing on a processor 185 of the network device 110). However, in other implementations, the scheduler 184 may be implemented on the network interface card 140 as part of the ingress engine 141. In some implementations, the packet processing rates may be set equally for each virtual machine. In some implementations, certain virtual machines 150 may be given preferential packet processing rates. In some implementations, the packet processing rates are set based on processor cycle allocations to each virtual machine 150, as different packets require different numbers of processor cycles to be processed, or the rates may be set based on a relative absolute packet processing allocation, e.g., using a round robin or other scheduling algorithm.

As shown in FIG. 1C, the processor 185 is configured to execute additional network functions, including a decryption function 186, an address translation function 187, and a firewall function 188. Different packets may require different ones of these network functions to be applied, depending on the type of communication involved.

Upon completion of processing a received packet 182, the network interface driver 122 generates an acknowledgement packet 189 to be transmitted back to the source of the received packet 183. In some implementations, according to some network protocols, each individual packet is not acknowledged, but groups of received packets 182 are acknowledged in a collective acknowledgement packet 189. Some network protocols do not require receipt acknowledgement at all. However, when an acknowledgement message is created, it is forwarded to the egress engine 144 of the network interface card 140 for transmission back to the source of the data packet 182. The acknowledgement packet 189 is then transmitted by the network interface card 140 over a physical interface on to a data link 120. While not explicitly shown in FIG. 1C, before the data packet including the acknowledgement message is finally transmitted, it may be temporarily stored in a transmission queue. Similarly, new data packets (i.e., not acknowledgement messages) may also be stored in transmission queues on the network interface card 140 prior to transmission, depending on the level congestion at the network interface card 140.

As discussed above, network traffic can be managed in some implementations based on what is referred to herein as engine RTT. The engine RTT refers to the time consumed in the processing of a received packet and the corresponding acknowledgement message packet by the network interface cards 140 and network interface drivers 122 of the source and destination network devices of the packet. Such delays reflect congestion when any part of that processing is delayed due to the processing of other packets being transmitted and/or received by the respective network interface drivers 122 and network interface cards 140 of the source and destination network devices 110. The remaining portion of the RTT is referred to as the fabric RTT, or the portion of the RTT during which the packet (and its corresponding acknowledgement) traverse the data links 120 and switches 115 between the source and destination network devices 110.

In order to facilitate a network device distinguishing between engine RTT and fabric RTT portions of the total RTT, the ingress engine 141, egress engine 144, and/or network interface driver 122 may provide time stamps in acknowledgement packets indicating when packets are received and transmitted by the network interface cards 140 of the source and destination network devices 110. In some implementations, the source network interface card 140 may store for each yet-to-be-acknowledged packet a transmit time indicating the time the packet was actually transmitted by the network interface card 140. A destination network interface card 140 may store for each received packet a time stamp indicating when the packet was received. When a corresponding acknowledgement message is transmitted, a difference between a current time and the stored receipt time can be added to the acknowledgement packet to indicate a measure of engine RTT. For protocols where multiple packets are acknowledged in a single acknowledgement packet, in some implementations the egress engine 144 of the network interface card 140 can include a calculated engine RTT value for the most recently received packet as the most current indication of any congestion at the destination network device 110.

Upon the network interface card 140 of the original source network device 110 receiving an acknowledgement message, the network device 110 (either at the ingress engine 141 or the network interface driver 122) can calculate the total RTT for the acknowledged packet(s), as well as subtract the engine RTT included in the acknowledgement packet to break the total RTT into its engine RTT and fabric RTT components.

Figure 2:
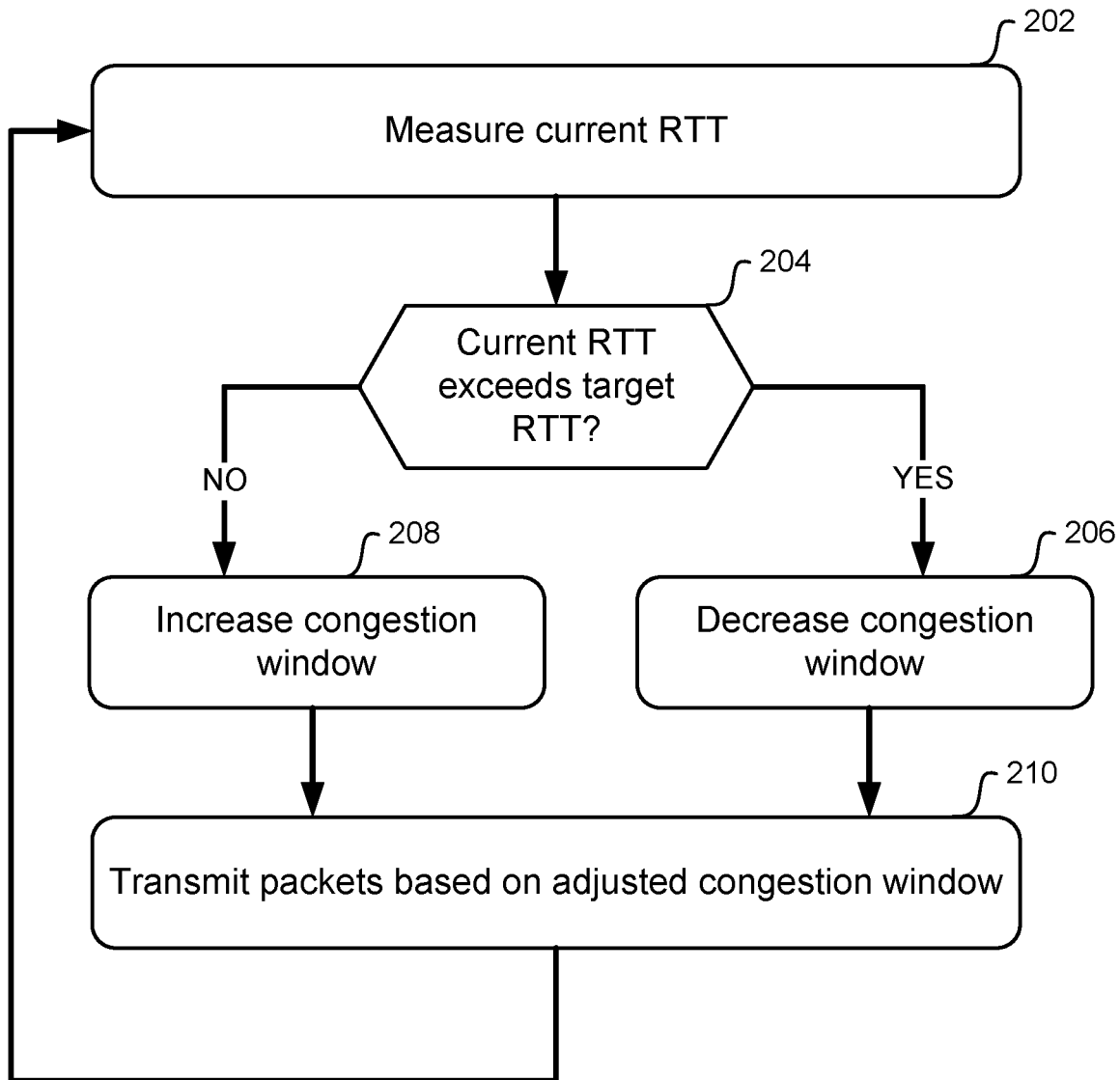
FIG. 2 is a flow chart illustrating an example process for managing network traffic in a data network, such as the data network shown in FIG. 1A.

FIG. 2 is a flow chart illustrating an example process 200 for managing network traffic in a data network, such as the data network 100 shown in FIG. 1A. For explanatory purposes, the various blocks of the example process 200 are described herein with reference to the components and/or processes described herein. The blocks of the process 200 may be implemented, for example, by one or more components or processors of network devices 110 of FIG. 1A or 1C. For example, the process 200 may be carried out by some combination of the network interface driver 122, ingress engine 141, and egress engine 144 of a network device 110. In some implementations, one or more of the blocks may be implemented apart from other blocks, and by one or more different processors or controllers. Further, for explanatory purposes, the blocks of the example process 200 are described as occurring serially, or linearly. However, multiple blocks of the example process 200 may occur in parallel. In addition, the blocks of the example process 200 need not be performed in the order shown and/or one or more of the blocks of the example process 200 need not be performed.

At block 202 of the process 200, a current round-trip time (RTT) is measured. As discussed above, a RTT is the combination of an engine RTT and a fabric RTT. As described above, the total RTT for a packet can be measured by a source network device 110 by subtracting an acknowledgement message receipt time stamp recorded by the source network device network interface card 140 from a stored packet transmission time stamp. In some implementations, instead of relying upon hardware time stamps provided by the network interface card 140, a total RTT time can be based on software time stamps stored when a packet is transmitted from the network interface driver 122 of the source network device to the network interface card 140 of the source network device 110 and the software time stamps stored when a packet acknowledgement message is passed from the source network device network interface card 140 to the source network device network interface driver 122.

At block 204, whether the current RTT exceeds a target RTT is determined. A target RTT may be set by a network administrator or a traffic management application as a desired amount of time it should take for a packet to be successfully transmitted and acknowledged. In some implementations, a single target total RTT can be set for all packets transmitted over a network. In some implementations, different target total RTT values can be set for different traffic flows. For example, a different target total RTT values may be set for flows having different quality of service indicators. Alternatively, or in addition, target total RTT values may be set based on service level obligations (SLOs) agreed upon between a cloud service provider and a cloud tenant. In some implementations, as discussed further below, a base target total RTT may be set for one or more flows, which may then be increased based on other factors, including network topology and current network congestion levels. Depending on the transmission medium (e.g., electrical vs. optical), a total target RTT in a data center environment may range from about 50 microseconds to about 200 microseconds. In some implementations, a total target RTT is set between about 100 microseconds and 200 microseconds.

If the current total RTT determined at block 202 exceeds the total target RTT (block 204=YES), the process 200 proceeds to block 206. Otherwise (block 204=NO), the process 200 proceeds to block 208.

At block 206, when the current RTT exceeds the target total RTT, the size of a congestion window for the network flow (i.e., the set of packets associated with the same tuple of header information, e.g., a source internet protocol (IP) address, source port number, destination IP address, destination port number, and a protocol identifier) is decreased. Decreasing the congestion window for the network flow limits the number of data packets being transmitted across the switches 115 and data links 120 carrying packets associated with the flow, and also limits the number of packets being processed by the destination network device. In some implementations, the congestion window can be decreased by a fixed increment, for example by subtracting a fixed number. In some implications, the congestion window can be reduced by multiplying the current congestion window by a factor that is less than 1. At block 208, when the current RTT does not exceed the target RTT, the size of a congestion window for data network 100 is increased to allow more packets to be transmitted over data network 100. In some implementations, the congestion window can be increased by a fixed increment, for example by adding a fixed number. In some implications, the congestion window can be increased by multiplying the current congestion window by a factor that is greater than 1. In some implementations, the congestion window size is only increased or decreased if the current RTT differs from the target RTT by more than a threshold percent (e.g., more than about 3% to more than about 10%, e.g., more than about 5%).

At block 210, the data packets are transmitted over data network 100 based on the adjusted congestion window size (e.g., decreased or increased window congestion size). Then, the process 200 is repeated from block 202 when a next packet acknowledgement message is received.

Figure 3:
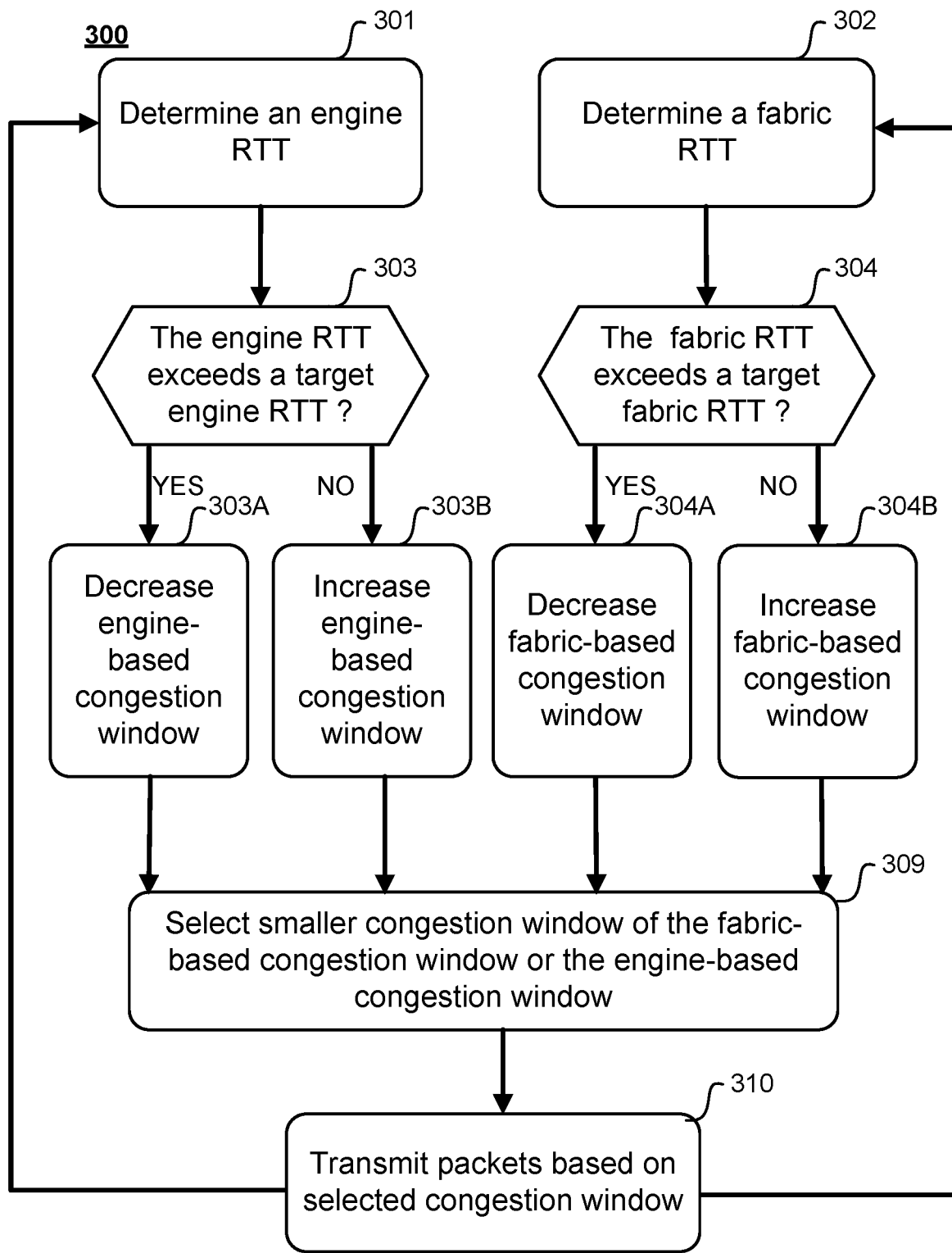
FIG. 3 is a flow chart illustrating an another example process for managing network traffic.

FIG. 3 is a flow chart illustrating another example process 300 for managing network traffic. The process 300 is a more refined process for managing network traffic based on round trip time, separately evaluating engine round trip time and fabric round trip time. The process 300 builds on the recognition that delays introduced by fabric congestion are different than delays introduced by engine congestion, and thus such delays should be evaluated and managed separately. The one or more of the blocks of the process 300 may be implemented, for example, by one or more components or processors of network devices 110 of FIG. 1. For example, the process 300 may be carried out by some combination of the network interface driver 122, ingress engine 141, and egress engine 144 of a network device 110. In some implementations, one or more of the blocks may be implemented apart from other blocks, and by one or more different processors or controllers. Further, for explanatory purposes, the blocks of the example process 300 are described as occurring serially, or linearly. However, multiple blocks of the example process 300 may occur in parallel. In addition, the blocks of the example process 300 need not be performed in the order shown and/or one or more of the blocks of the example process 300 need not be performed.

At blocks 301 and 302, an engine RTT and a fabric RTT, respectively, are determined. As described above, the engine RTT is the length of time it takes from when a destination network device receives a data packet to when the destination generates and transmits an acknowledgement of receipt of the data packet. The fabric RTT is the amount of time the original data packet and the acknowledgment packet spend traversing the network 100 between the source and destination network devices 110. Also as described above, the engine RTT can be calculated by the destination network interface card by the egress engine of the network interface card taking a difference between when a packet is received and a corresponding acknowledgement packet is transmitted. The RTT can then be added to the acknowledgement message upon transmission. Thus, the engine RTT can be determined at block 301 by extracting the engine RTT from the acknowledgement message. The fabric RTT can be calculated at block 302 by subtracting the engine RTT from the total RTT. As discussed above, the total RTT can be determined by a source network interface card calculating a difference between a stored transmission time stamp for a packet and a time stamp associated with the receipt of a corresponding acknowledgement packet. Alternatively, the total RTT can be determined based on software time stamps stored when a packet is forwarded to a network interface card and when an acknowledgement message is forwarded from the network interface card to the network interface driver of the source network device.

In the process 200 discussed in relation to FIG. 2, RTT analysis was carried out against a total target RTT. In the process 300, two RTT analyses are conducted. One is based on a target engine RTT. The other is based on a target fabric RTT. As with the total target RTT, the same target engine RTT value and target fabric RTT value may be used for all flows. In some implementations, different target engine RTT values and/or fabric RTT values may be used based on a variety of factors, including tenant SLOs, quality of service indicators associated with the flow, or other factors. As discussed further below, in some implementations, target engine RTT values for a given flow may be adjusted based on current network load metrics (e.g., the current congestion window). In some implementations, the target fabric RTT may be adjusted based on network topology information (e.g., the number of data links or number of packet switches packets of the flow traverse). Suitable values for a target fabric RTT range from about 30 microseconds to about 180 microseconds. Suitable values for target engine RTT range from about 20 microseconds to about 100 microseconds.

At block 303, whether the determined engine RTT exceeds a target engine RTT is determined. If the determined engine RTT does not exceed the target engine RTT (block 303=NO), the process 300 proceeds to block 303B where the engine-based congestion window is increased. If the determined engine RTT exceeds the target engine RTT (block 303=YES), the process proceeds to block 303A where the fabric-based congestion window is decreased.

At block 304, whether the determined fabric RTT exceeds a target fabric RTT for the flow is determined. If the determined fabric RTT does not exceed the target fabric RTT (block 304=NO), the process 300 proceeds to block 304B where the fabric-based congestion window is increased. If the determined fabric RTT exceeds the target fabric RTT (block 304=YES), the process 300 proceeds to block 304A where the fabric-based congestion window is decreased.

With respect to both the engine and fabric congestion windows, in some implementations, when decreased, a congestion window can be decreased by a fixed increment, for example by subtracting a fixed number. In some implications, a congestion window can be reduced by multiplying the current congestion window by a factor that is less than 1. Similarly, when increased, in some implementations, the congestion window can be increased by a fixed increment, for example by adding a fixed number. In some implications, the congestion window can be increased by multiplying the current congestion window by a factor that is greater than 1.

At block 309, either the engine-based congestion window or the fabric-based congestion window, whichever is smaller, is selected for use as the current congestion window. The selected engine-based congestion window or fabric-based congestion window is then used to transmit packets at block 310.

Figure 4:
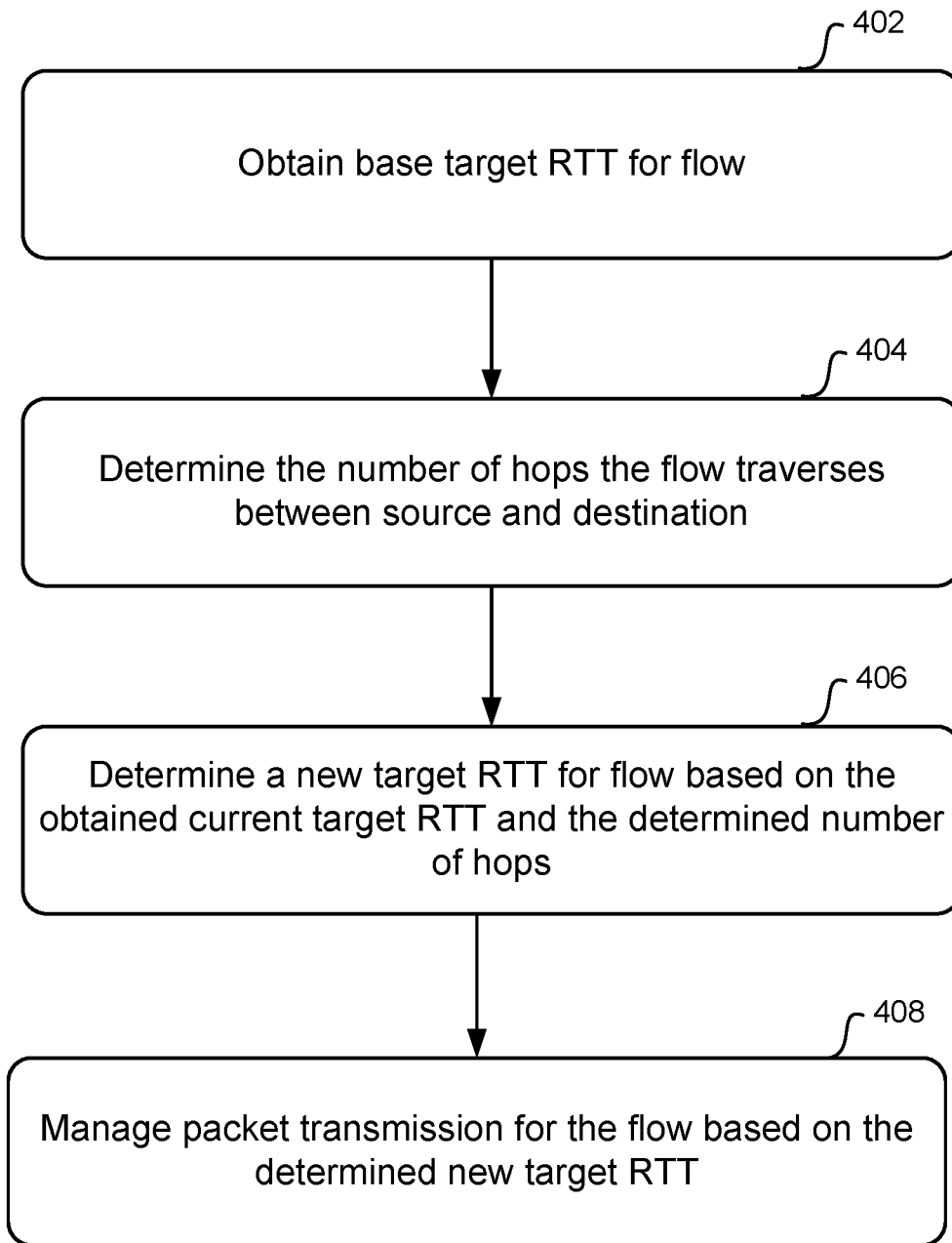
FIG. 4 is a flow chart illustrating an example process for scaling a target RTT based on a network topology.

FIG. 4 is a flow chart illustrating and example process 400 for scaling a target RTT based on a network topology, according to one or more embodiments. In some implementations, the process 400 can be used to scale a target total RTT suitable for use in the process 200 shown in FIG. 2. In some implementations, the process 400 can be used to scale a target fabric RTT suitable for use in the process 300 shown in FIG. 3. For explanatory purposes, the various blocks of the example process 400 are described herein with reference to the components and/or processes described herein. One or more of the blocks of the process 400 may be implemented, for example, by one or more components or processors of network devices 110 shown in FIG. 1. For example, the process 400 may be carried out by some combination of the network interface driver 122, ingress engine 141, and egress engine 144 of a network device 110. In some implementations, one or more of the blocks may be implemented apart from other blocks, and by one or more different processors or controllers. Further, for explanatory purposes, the blocks of the example process 400 are described as occurring serially, or linearly. However, multiple blocks of the example process 400 may occur in parallel. In addition, the blocks of the example process 400 need not be performed in the order shown and/or one or more of the blocks of the example process 400 need not be performed.

At block 402, the target RTT for a flow is obtained. As discussed above, the target RTT may be a total target RTT or a target fabric RTT. At block 404, the number of hops packets associated with the flow traverse between the source and the destination is determined. The number of hops may correspond to the number of data links 120, the total number of switches 115, or the number of packet switches, data packets of the flow traverse from its source network device to its destination network device. In some implementations, the number of hops may be determined by evaluating a TTL field included in an packet acknowledgement message or any other packet received from the destination network device in association with the flow (e.g., as part of a handshaking protocol used in setting up the flow), assuming that such packets traverse the same path the corresponding data packet originally traversed, but in reverse order. In some implementations, the number of hops is determined by the source network device transmitting a traceroute or similar control packet to the destination network device.

At block 406, a new target RTT is determined based on the obtained target RTT and the determined number of hops. In some implementations, a configurable amount of time is added to the target RTT for each hop in the path traversed by packets in the flow. Suitable amounts of time range from between 3 microseconds per hop to 10 microseconds per hop. The per-hop time value may be set by a traffic management application or a system administrator. The per-hop time value may be applied equally to all flows or different per-hop time values may be added to different flows based on, e.g., operative SLOs or the type of communication medium the packets traverse. For example, for hybrid networks including optical and electrical links, different per-hop time increments may be added based on whether the hops are optical or electrical. For example, for a flow traversing hops, and the per-hop time increment is five microseconds, the target RTT would be increased by 15 microseconds.

The process moves on to block 408 where the data packet transmission for the flow is managed based on the determined new target RTT. In some implementations, the process 400 is repeated upon a determination that the number of hops associated with a flow has changed. For example, TTL values in packet acknowledgement messages may be regularly monitored for a change from prior TTL values to determine if a hop count has changed.

Figure 5:
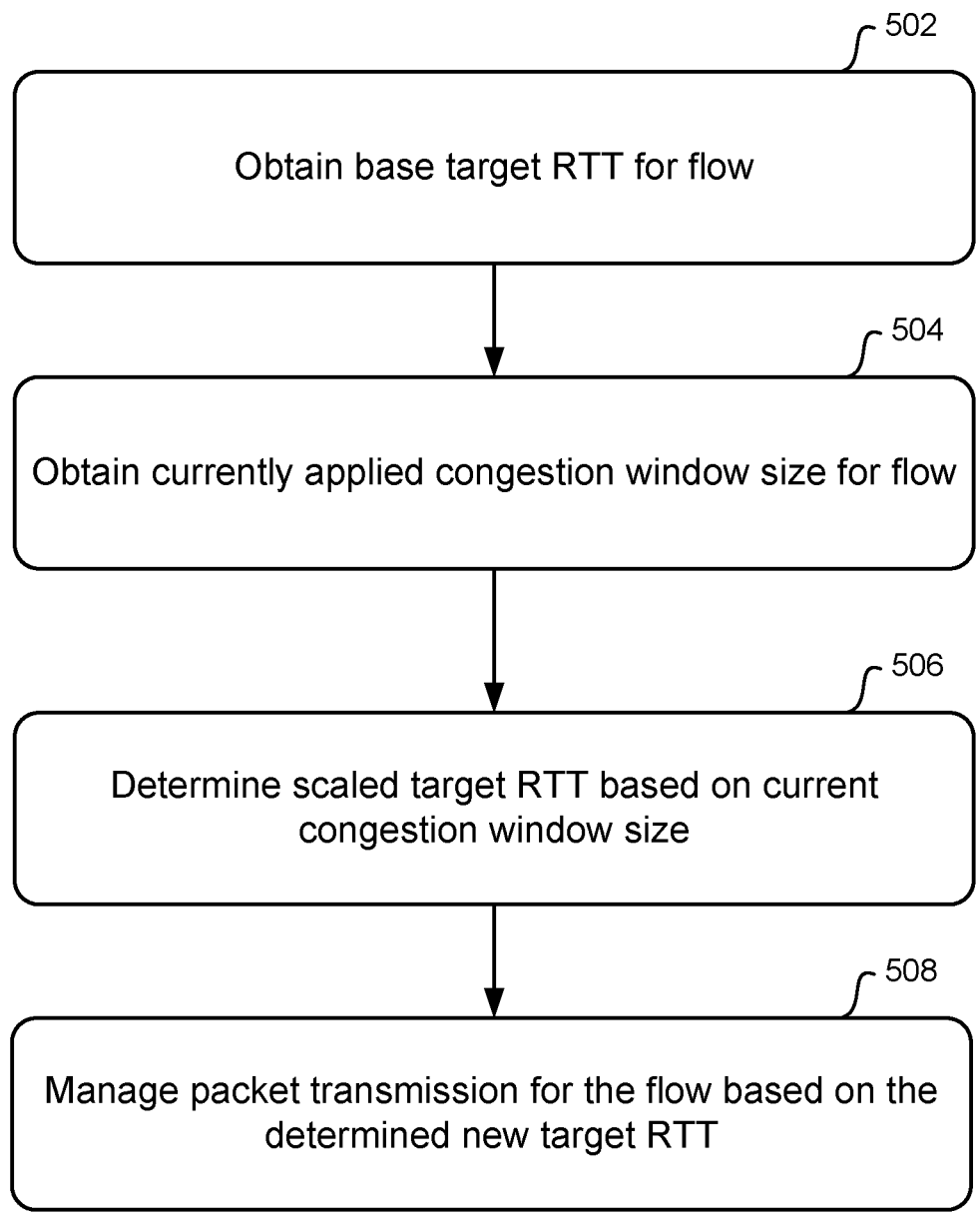
FIG. 5 is a flow chart illustrating another example process for scaling a target RTT according to one or more embodiments.

FIG. 5 is a flow chart illustrating another example process 500 for scaling a target RTT. The process 500 scales a target RTT based on a current network load, rather than based on network topology. The process 500 can be used, in various implementations, for scaling total target RTT values, fabric RTT values, and/or engine RTT values. For explanatory purposes, the various blocks of the example process 500 are described herein with reference to the components and/or processes described herein. For example, the process 500 may be carried out by some combination of the network interface driver 122, ingress engine 141, and egress engine 144 of a network device 110. One or more of the blocks of process 500 may be implemented, for example, by one or more components or processors of network devices 110 of FIG. 1A or 1C. In some implementations, one or more of the blocks may be implemented apart from other blocks, and by one or more different processors or controllers. Further, for explanatory purposes, the blocks of the example process 500 are described as occurring serially, or linearly. However, multiple blocks of the example process 500 may occur in parallel. In addition, the blocks of the example process 500 need not be performed in the order shown and/or one or more of the blocks of the example process 500 need not be performed.

At block 502, the base target RTT for a flow is obtained. As discussed above, the target RTT for the flow can be a target total RTT, a target engine RTT, and/or a target fabric RTT, and can be set by a network administrator or traffic management application. At block 504, the size of the currently applied congestion window for the flow is obtained. At block 506, a scaled target RTT is determined based on the base target RTT and the currently applied congestion window. In this process, the current congestion window size is used as a proxy for the overall load on the portion of the network traversed by the flow. In other implementations, other metrics of network load may be employed instead of the congestion window. To obtain the new target RTT, in some implementations, a value is added to the base target RTT (i.e., NewTargetRTT=BaseTargetRTT+AdditionValue). In other implementations, the new target RTT is obtained by multiplying the base target RTT by a multiplication factor (i.e., TargetRTT=BaseTargetRTT*MultiplicationFactor). In some cases, the addition value or multiplication factor is inversely proportional to the size the of current congestion window. For example, the addition value or multiplication factor may be in the form of $$x * \frac{MaxCongestionWindowSize}{CurrentCongestionWindowSize},$$

where x is a positive number. For calculating addition values, in some implementations, the x is a positive number greater than or equal to 1.0. For calculating a multiplication factor, in some implementations, x is a positive number less than or equal to 1.0. In some implementations, the addition value or multiplication factor can be of the form of $$\frac{A}{\sqrt{CurrentCongestionWindowSize}},$$

here A is a positive number. In some implementations, a ceiling and/or a floor may be included in the calculation of the new target RTT. For example, in some implementations, the new target RTT may have a ceiling of 300 microseconds a floor of about 50 microseconds.

After a new target RTT is calculated, at block 508, network traffic is managed based on the new target RTT, e.g., as described in relation to FIGS. 2 and 3. In some implementations, the process may be carried out in response to the congestion window for the flow changing by more than a threshold percentage (e.g., 20-30%) from the congestion window used to calculate the new target RTT.

Figure 6:
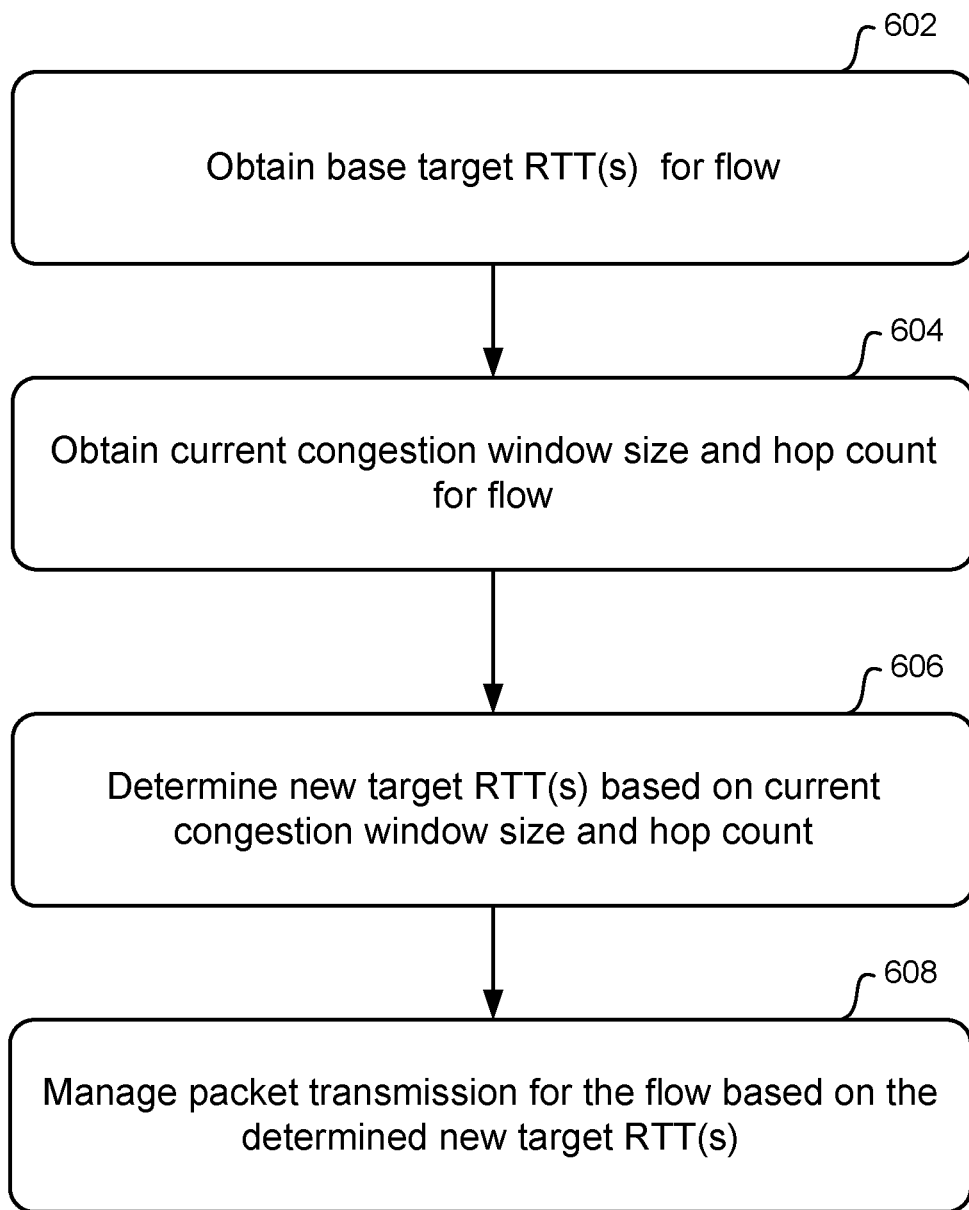
FIG. 6 is a flow chart illustrating another example process for scaling target RTT values.

FIG. 6 is a flow chart illustrating another example process 600 for scaling target RTT values. The process 600 scales a target engine RTT based on a current network load and a target fabric RTT based on network topology. The process 600 can be used, e.g., to determine appropriate target engine and fabric RTT values to use in the process 300 shown in FIG. 3. For explanatory purposes, the various blocks of the example process 600 are described herein with reference to the components and/or processes described herein. One or more of the blocks of process 600 may be implemented, for example, by one or more components or processors of network devices 110 of FIG. 1A or 1C. For example, the process 600 may be carried out by some combination of the network interface driver 122, ingress engine 141, and egress engine 144 of a network device 110. In some implementations, one or more of the blocks may be implemented apart from other blocks, and by one or more different processors or controllers. Further, for explanatory purposes, the blocks of the example process 600 are described as occurring serially, or linearly. However, multiple blocks of the example process 600 may occur in parallel. In addition, the blocks of the example process 600 need not be performed in the order shown and/or one or more of the blocks of the example process 600 need not be performed.

The process 600 includes obtaining base target RTT(s) for a flow at block 602. In some implementations, a base total target RTT is obtained, as described in relation to block 204 for FIG. 2. In some implementations, at block 602, a base target engine RTT and a base target fabric RTT are obtained. Obtaining a base target fabric RTT is discussed in relation to block 402 of FIG. 4. Obtaining a base target engine RTT is discussed in relation to block 502 of FIG. 5.

The process also includes obtaining the hop count for the flow and the currently applied congestion window size for the flow at block 604. These process steps can be carried out as described above in relation to blocks 404 and 504 of FIGS. 4 and 5, respectively.

At stage 606, new target RTT(s) are determined based on the obtained base target RTT(s), the hop count, and the currently applied congestion window size for the flow. In implementations where the base target RTT is a base target total RTT, a scaled target total RTT can be calculated by increasing the base target total RTT based on both the current congestion window size and the hop count associated with the flow. For example, the base target total RTT can be incremented based on the hop count as described in relation to block 406 of FIG. 4, and the resultant value can be further adjusted as described in relation to block 506 of FIG. 5 based on the congestion window size. Alternatively, the base target total RTT can first be adjusted based on congestion window size in accordance with block 506 of FIG. 5 and then incremented based on hop count in accordance with block 406 of FIG. 4. In implementations in which new target RTTs are determined for both a target engine RTT and a target fabric RTT, the target fabric RTT can be increased based on the obtained hop count for the flow as described in relation to block 406 of FIG. 4 and the target fabric RTT can be increased based on the congestion window size as described in relation to block 506 of FIG. 5.

At block 608, network traffic is managed based on the new target RTT(s). The new target RTT(s) can be used for example, in the processes 200 and 300 shown in FIGS. 2 and 3, respectively. In some implementations, the process 600 may be carried out any time the congestion window for a flow changes. The process 600 may be repeated in response to changes in topology (i.e., flow hop count) or flow congestion window size, as described above.

FIG. 7 is a block diagram illustrating a general architecture for a computer system 900 that may be employed to implement elements of the systems and methods described and illustrated herein, according to an illustrative implementation. The computing system 900 may be utilized in implementing the methods of operating, for example, network devices 110 shown in FIGS. 1-5.

In broad overview, the computing system 910 includes at least one processor 950 for performing actions in accordance with instructions and one or more memory devices 970 or 975 for storing instructions and data. The illustrated example computing system 910 includes one or more processors 950 in communication, via a bus 915, with at least one network interface controller 920 with one or more network interface ports 922 connecting to one or more network devices 924, memory 970, and any other devices 980, e.g., an I/O interface. Generally, a processor 950 will execute instructions received from memory. The processor 950 illustrated incorporates, or is directly connected to, cache memory 975.

In more detail, the processor 950 may be any logic circuitry that processes instructions, e.g., instructions fetched from the memory 970 or cache 975. In many embodiments, the processor 950 is a microprocessor unit or special purpose processor. The computing device 900 may be based on any processor, or set of processors, capable of operating as described herein. In some implementations, the processor 950 can be capable of executing the methods operating network devices 110 shown in FIGS. 2-6. The processor 950 may be a single core or multi-core processor. The processor 950 may be multiple processors.

The memory 970 may be any device suitable for storing computer readable data. The memory 970 may be a device with fixed storage or a device for reading removable storage media. Examples include all forms of non-volatile memory, media and memory devices, semiconductor memory devices (e.g., EPROM, EEPROM, SDRAM, and flash memory devices), magnetic disks, magneto optical disks, and optical discs (e.g., CD ROM, DVD-ROM, and Blu-ray® discs). A computing system 900 may have any number of memory devices 970. In some implementations, the memory 970 can include instructions corresponding to the method of methods operating network devices 110 shown in FIGS. 2-6. In some implementations, the memory 970 supports virtualized or containerized memory accessible by virtual machine or container execution environments provided by the computing system 910.

The cache memory 975 is generally a form of computer memory placed in close proximity to the processor 950 for fast read times. In some implementations, the cache memory 975 is part of, or on the same chip as, the processor 950. In some implementations, there are multiple levels of cache 975, e.g., L2 and L3 cache layers.

The network interface controller 920 manages data exchanges via the network interfaces 922 (also referred to as network interface ports). The network interface controller 920 handles the physical and data link layers of the OSI model for network communication. In some implementations, some of the network interface controller's tasks are handled by the processor 950. In some implementations, the network interface controller 920 is part of the processor 950. In some implementations, a computing system 910 has multiple network interface controllers 920. The network interfaces 922 are connection points for physical network links. In some implementations, the network interface controller 920 supports wireless network connections and an interface port 922 is a wireless receiver/transmitter. Generally, a computing device 910 exchanges data with other network devices 924 via physical or wireless links to a network interfaces 922. In some implementations, the network interface controller 920 implements a network protocol such as Ethernet.

The other network devices 924 are connected to the computing device 910 via a network interface port 922. The other network devices 924 may be peer computing devices, network devices, or any other computing device with network functionality. For example, a first network device 924 may be a network device such as a hub, a bridge, a switch, or a router, connecting the computing device 910 to a data network such as the Internet.

The other devices 980 may include an I/O interface, external serial device ports, and any additional co-processors. For example, a computing system 910 may include an interface (e.g., a universal serial bus (USB) interface) for connecting input devices (e.g., a keyboard, microphone, mouse, or other pointing device), output devices (e.g., video display, speaker, or printer), or additional memory devices (e.g., portable flash drive or external media drive). In some implementations, a computing device 900 includes an additional device 980 such as a coprocessor, e.g., a math co-processor can assist the processor 950 with high precision or complex calculations.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs embodied on a tangible medium, i.e., one or more modules of computer program instructions, encoded on one or more computer storage media for execution by, or to control the operation of, a data processing apparatus. A computer storage medium can be, or be included in, a computer-readable storage device, a computer-readable storage substrate, a random or serial access memory array or device, or a combination of one or more of them. The computer storage medium can also be, or be included in, one or more separate components or media (e.g., multiple CDs, disks, or other storage devices). The computer storage medium may be tangible and non-transitory.

The operations described in this specification can be implemented as operations performed by a data processing apparatus on data stored on one or more computer-readable storage devices or received from other sources. The operations may be executed within the native environment of the data processing apparatus or within one or more virtual machines or containers hosted by the data processing apparatus.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers or one or more virtual machines or containers that are located at one site or distributed across multiple sites and interconnected by a communication network. Examples of communication networks include a local area network ("LAN") and a wide area network ("WAN"), an inter-network (e.g., the Internet), and peer-to-peer networks (e.g., ad hoc peer-to-peer networks).

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

References to "or" may be construed as inclusive so that any terms described using "or" may indicate any of a single, more than one, and all of the described terms. The labels "first," "second," "third," and so forth are not necessarily meant to indicate an ordering and are generally used merely to distinguish between like or similar items or elements.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

What is claimed is:

1. A method comprising:
   obtaining a base target round-trip time (RTT) for packets of a network flow including packets transmitted from a source network device to destination network device;
   determining a number of hops packets associated with the network flow traverse between the source network device and the destination network device;
   determining a topology scaled target RTT for the network flow by adding the base target RTT with the determined number of hops multiplied by a per hop time increment;
   transmitting by the source network device a packet associated with the network flow based on a first congestion window size;
   receiving by the source network device a packet including an acknowledgement message indicating the destination network device received the transmitted packet;
   determining a RTT for the transmitted packet based on the receipt of the packet including the acknowledgment message; and
   adjusting a congestion window size for the network flow based on a comparison of the RTT of a transmitted packet to the topology scaled target RTT.

2. The method of claim 1, further comprising decreasing the congestion window size in response to the determined RTT for the transmitted packet exceeding the topology scaled RTT.

3. The method of claim 1, further comprising increasing the congestion window size in response to the determined RTT for the transmitted packet not exceeding the topology scaled RTT.

4. The method of claim 1, wherein adjusting the congestion window based on the comparison of the determined RTT for the transmitted packet to the topology scaled target RTT comprises adjusting the congestion window size only if the determined RTT for the transmitted packet differs from topology scaled target RTT by more than a threshold amount.

5. The method of claim 4, wherein the threshold amount is between about 3% and about 10% of the topology scaled target RTT.

6. The method of claim 1, wherein the number of hops is determined based on evaluation of a TTL field in the packet including the acknowledgement message.

7. The method of claim 1, further comprising determining that the number of hops traversed by packets associated with the network follow from the source network device to the destination network device has changed, and in response calculating a second topology scaled target RTT for the network flow.

8. The method of claim 1, further comprising determining a second topology scaled target RTT for a second network flow including packets transmitted from the source network device to a second destination network device, wherein the second destination network device is different from the destination network device and the second topology scaled target RTT is different than the topology scaled target RTT.

9. A system comprising:
one or more processors; and
a non-transitory machine-readable medium comprising instructions stored therein, which when executed by the one or more processors, cause the one or more processors to perform operations comprising:
obtaining a base target round-trip time (RTT) for packets of a network flow including packets transmitted from a source network device to destination network device;
determining a number of hops packets associated with the network flow traverse between the source network device and the destination network device;
determining a topology scaled target RTT for the network flow by adding the base target RTT with the determined number of hops multiplied by a per hop time increment;
transmitting by the source network device a packet associated with the network flow based on a first congestion window size;
receiving by the source network device a packet including an acknowledgement message indicating the destination network device received the transmitted packet;
determining a RTT for the transmitted packet based on the receipt of the packet including the acknowledgment message; and
adjusting a congestion window size for the network flow based on a comparison of the RTT of a transmitted packet to the topology scaled target RTT.

10. The system of claim 9, wherein the operations further comprise decreasing the congestion window size in response to the determined RTT for the transmitted packet exceeding the topology scaled RTT.

11. The system of claim 9, wherein the operations further comprise increasing the congestion window size in response to the determined RTT for the transmitted packet not exceeding the topology scaled RTT.

12. The system of claim 9, wherein adjusting the congestion window based on the comparison of the determined RTT for the transmitted packet to the topology scaled target RTT comprises adjusting the congestion window size only if the determined RTT for the transmitted packet differs from topology scaled target RTT by more than a threshold amount.

13. The system of claim 12, wherein the threshold amount is between about 3% and about 10% of the topology scaled target RTT.

14. The system of claim 9, wherein the number of hops is determined based on evaluation of a TTL field in the packet including the acknowledgement message.

15. The system of claim 9, wherein the operations further comprise determining that the number of hops traversed by packets associated with the network follow from the source network device to the destination network device has changed, and in response calculating a second topology scaled target RTT for the network flow.

16. The system of claim 9, wherein the operations further comprise determining a second topology scaled target RTT for a second network flow including packets transmitted from the source network device to a second destination network device, wherein the second destination network device is different from the destination network device and the second topology scaled target RTT is different than the topology scaled target RTT.

* * * * *